United States Patent [19]
Tischendorf

[11] Patent Number: 5,769,396
[45] Date of Patent: Jun. 23, 1998

[54] MULTI-PURPOSE MOTORCYCLE LIFT

[76] Inventor: Joseph W. Tischendorf, 1525B Hwy. 175, Hubertus, Wis. 53033

[21] Appl. No.: 731,860

[22] Filed: Oct. 21, 1996

[51] Int. Cl.⁶ ...................................................... B60P 1/48
[52] U.S. Cl. ......................... 254/131; 254/10 C; 254/134
[58] Field of Search ................................... 254/8 R, 8 B, 254/8 C, 10 R, 10 B, 10 C, 131, 120, 133, 134

[56] References Cited

U.S. PATENT DOCUMENTS

| | | |
|---|---|---|
| 1,129,775 | 2/1915 | Anthony ................................ 254/10 C |
| 1,818,060 | 8/1931 | Holman ................................ 254/10 C |
| 2,121,764 | 6/1938 | Quayle ................................ 254/10 C |
| 4,420,164 | 12/1983 | Mitchell . |
| 4,681,299 | 7/1987 | Siebert . |
| 4,723,756 | 2/1988 | Stumpf . |
| 5,193,784 | 3/1993 | Obernberger . |
| 5,271,603 | 12/1993 | White ................................... 254/10 C |
| 5,405,236 | 4/1995 | Sundstrom et al. ................... 254/10 C |
| 5,518,224 | 5/1996 | Anderson . |

*Primary Examiner*—Robert C. Watson
*Attorney, Agent, or Firm*—Donald J. Ersler

[57] ABSTRACT

A multi-purpose motorcycle lift includes a base, a lift assembly, and a lift bar. The left leg is pivotally connected to first end of the base, and the right leg is pivotally connected to the second end of the base, such that the left and right legs pivot freely with respect to the base. The front side of the left and right legs are pivotally connected to the front support, and the rear side of the left and right legs are pivotally connected to the rear support. The front and rear supports pivot in a parallel motion to the base. One end of the lift bar is fastened to the left leg and a stirrup protrudes from the other end such that a user may insert a shoe. The user operates the multi-purpose motorcycle lift by inserting a shoe into the stirrup and pushing downward until the left and right legs contact the base. A shot pin may be inserted through the pair of projections to insure that the multi-purpose motorcycle lift doesn't return to a retracted position. Retraction is accomplished by removing the shot pin, inserting a shoe through the stirrup, and pulling upward on the stirrup until the lift assembly passes over the center of gravity and then using downward force of the foot to gently allow multi-purpose motorcycle lift to return to the retraced position.

12 Claims, 2 Drawing Sheets

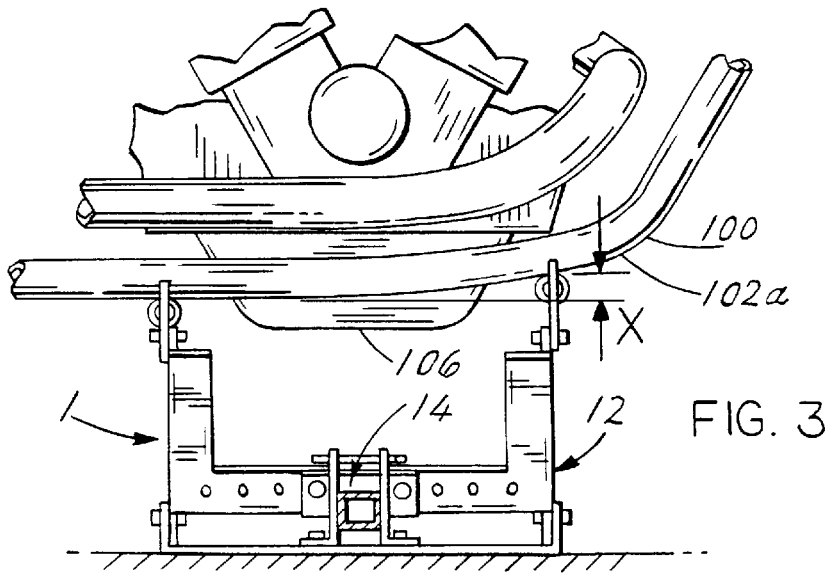
FIG. 3
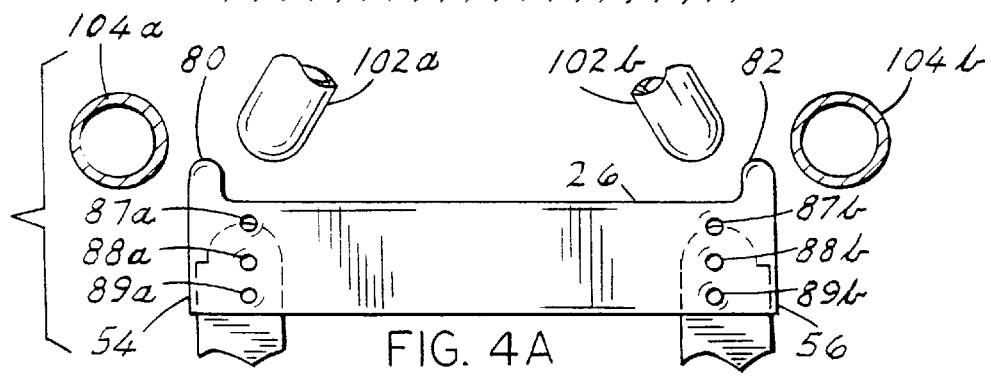
FIG. 4A
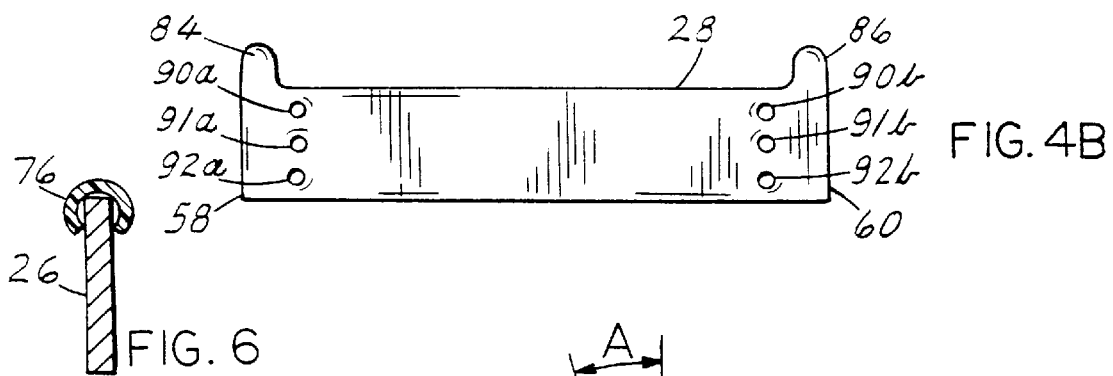
FIG. 4B
FIG. 6
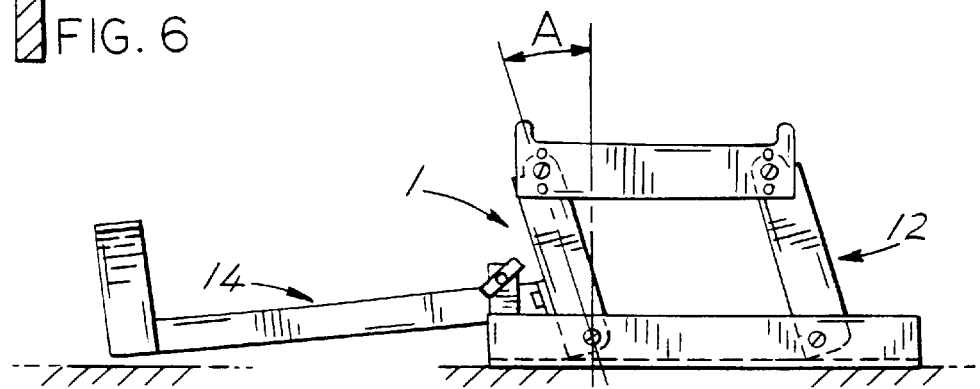
FIG. 5

MULTI-PURPOSE MOTORCYCLE LIFT

BACKGROUND OF THE INVENTION

1. Field of the Invention

The present invention relates generally to a motorcycle lifts and more specifically to a multi-purpose motorcycle lift which is easy to use, can support a large motorcycle, and is less complex than that of the prior art.

2. Discussion of the Prior Art

A motorcycle lift is used to raise a motorcycle off the ground for cleaning, maintenance, storage, and display. There are several designs on the market. One design of motorcycle lift, raises only one wheel off the ground at a time. The drawback to this type of lift is that it cannot be used for storage of a motorcycle during the winter. Motorcycle owners want both wheels off the ground when their bike is in storage. Another design of motorcycle lifts requires a hydraulic cylinder or a scissors jack to raise the motorcycle; both wheels of the motorcycle will be raised off the ground, but hydraulic cylinders and scissors jacks are expensive and take a long time to raise the motorcycle. Another drawback to the hydraulic cylinder/scissors jack designs are that they have no provision for adjusting the angularity of the lift surface. Many motorcycle frames are not parallel to the ground; if the lift has no adjustability for this problem, the motorcycle will not be level for performing such simple maintenance necessities as measuring the oil or transmission fluid levels.

A motorcycle lift stand by Anderson, U.S. Pat. No. 5,518,224, does address the problem of complexity and quick lift but does not address the problem of frame angularity. It is also not suitable for lifting a large motorcycle such as a Harley Hog because of the impracticality of driving a large motorcycle over a lift surface. There are also some safety problems which the Anderson '224 patent fails to address. The user's foot may slip off the lever while the motorcycle is being lifted, since there is no means of retaining the foot in positive contact with the lever. Another safety issue is the problem of an user's leg getting struck by the lever. The lever has capability of swinging 180 degrees, if the motorcycle comes down too quickly, the user's leg could be struck by a freely pivoting lever. Another disadvantage of the Anderson '224 patent is that the user has to actuate the lever in an area where there can be numerous protrusions such as saddle bags, foot pegs and exhaust pipes. The user will find it hard to operate the lift if there is an element protruding outward from the rear of the motorcycle. A user's clothing may be soiled or ripped by merely lifting or retracting the motorcycle lift.

Accordingly, there is a clearly felt need in the art for a motorcycle lift which is safe to operate, is less complex than the prior art, can be used for the largest types of motorcycles, can be adjusted for the angularity of motorcycle frames, can be quickly operated, and is economical to manufacture.

SUMMARY OF THE INVENTION

The primary objective of the present invention is to provide a motorcycle lift which is safe to operate, is less complex than the prior art, can used for the largest types of motorcycles, can be adjusted for the angularity of motorcycle frames, can be quickly operated, and is economical to manufacture.

According to the present invention, a multi-purpose motorcycle lift includes a base, a lift assembly, and a lift bar. The base comprises a front upright portion, a rear upright portion, and a platform. The front upright portion extends upward perpendicularly from a front end of the base. The rear upright portion extends upward perpendicularly from a rear end of the base and is parallel to the front upright portion. The lift assembly comprises a left leg, a right leg, a front support, and a rear support. The left leg has a first end, a second end, a front side, and a rear side. The right leg has a first end, a second end, a front side, and a rear side.

The first end of the left leg is pivotally connected to a first end of the front upright portion and a first end of the rear upright portion, such that the left leg freely pivots with respect to the base. The first end of the right leg is pivotally connected to a second end of the front upright portion and a second end of the rear upright portion, such that the right leg freely pivots with respect to the base.

A first end of the front support is pivotally connected to the front side of the left leg at the second end thereof and a second end of the front support is pivotally connected to the front side of the right leg at the second end thereof such that the front support pivots parallel to the platform. The front support has at least one extra set of pivot holes for leveling a motorcycle with an angled bottom frame. A first end of the rear support is pivotally connected to the rear side of the left leg at the second end thereof and a second end of the rear support is pivotally connected to the rear side of the right leg at the second end thereof such that the rear support pivots parallel to the platform.

The lift bar comprises a lever, a pedal, and a stirrup. A first end of the lever is fastened to the left leg at substantially the first end and can be positioned at different points between the front side and rear side. The pedal is fastened to the second end of the lever. A stirrup extends upward from each end of the pedal such that a user may insert a shoe or boot therethrough. A pair of projections also extend upward from the base, the pair of projections are disposed such that the lever fits between thereof. A bore is formed through each projection such that a pin may be passed therethrough and trap the lever.

The multi-purpose motorcycle lift is operated by first pushing thereof under the frame of a motorcycle. The multi-purpose motorcycle lift is positioned such that the front and rear supports fit securely under the frame of the motorcycle. The user inserts a shoe into the stirrup and pushes downward with the foot while securing the motorcycle with both hands. After the lift assembly passes over the center of gravity, the motorcycle will remain in an upright position. A shot pin may be inserted through the pair of projections to insure that a user doesn't accidental nudge the multi-purpose motorcycle lift and cause it to return to a retracted position. The multi-purpose motorcycle lift may be retracted by removing the shot pin, securing the motorcycle with both hands, inserting a shoe through the stirrup and pulling upward on the stirrup until the lift assembly passes over the center of gravity and then using downward force of the foot to gently allow multi-purpose motorcycle lift to return to the retraced position.

Accordingly, it is an object of the present invention to provide a multi-purpose motorcycle lift which is less complex than that of the prior art.

It is a further object of the present invention to provide a multi-purpose motorcycle lift which can be used for the largest types of motorcycles.

It is yet a further object of the present invention to provide a multi-purpose motorcycle lift which can be adjusted for the angularity of a motorcycle frame.

It is yet a further object of the present invention to provide a multi-purpose motorcycle lift which can be quickly operated.

It is yet a further object of the present invention to provide a multi-purpose motorcycle lift which can be safely operated.

It is yet a further object of the present invention to provide a multi-purpose motorcycle lift which allows the user to maintain positive foot contact with the lever at all times during lifting and retraction.

Finally, it is another object of the present invention to provide a multi-purpose motorcycle lift which is economical to manufacture.

These and additional objects, advantages, features and benefits of the present invention will become apparent from the following specification.

BRIEF DESCRIPTION OF THE DRAWINGS

FIG. 3 is a side detail view of a multi-purpose motorcycle lift in an upright position supporting a motorcycle frame in accordance with the present invention;

FIG. 4a is a front view of a front support of a multi-purpose motorcycle lift in accordance with the present invention;

FIG. 4b is a front view of a rear support of a multi-purpose motorcycle lift in accordance with the present invention;

FIG. 5 is a front detail view of a multi-purpose motorcycle lift in an upright position in accordance with the present invention; and FIG. 6 is a cross-sectional view of a front frame protector fastened to a front support in accordance with the present invention.

DETAILED DESCRIPTION OF THE PREFERRED EMBODIMENTS

Figure 1:
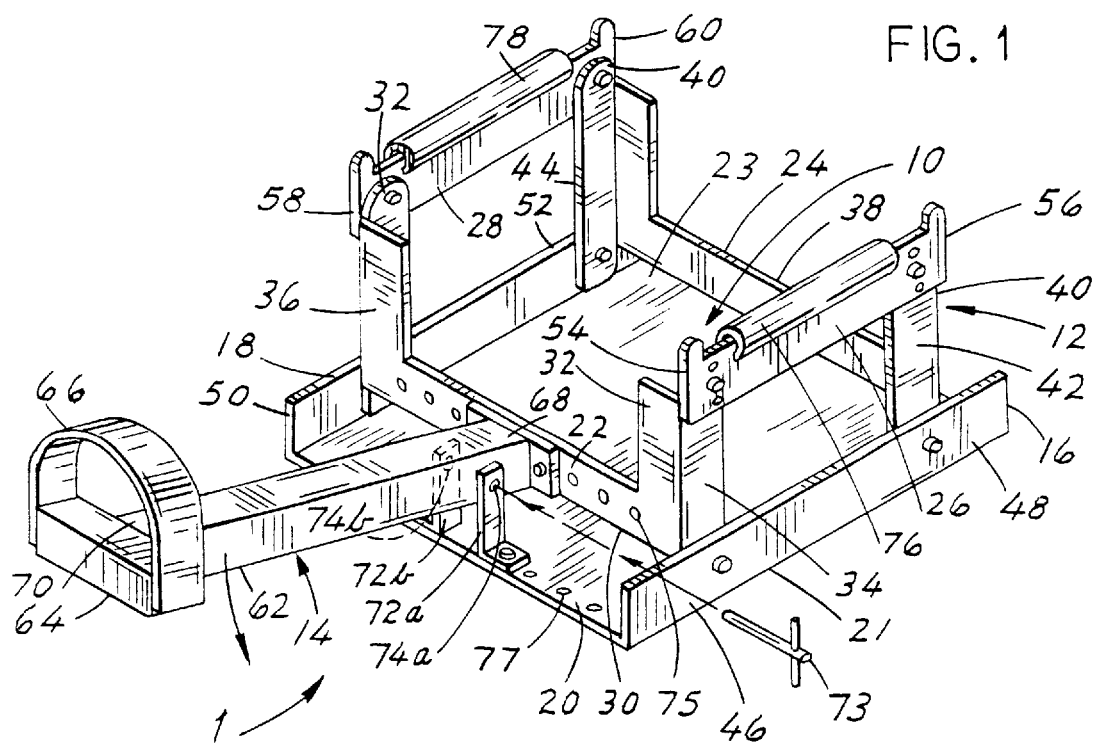
FIG. 1 is a perspective detail view of a multi-purpose motorcycle lift in an upright position in accordance with the present invention.

With reference now to the drawings, and particularly to FIG. 1, there is shown a perspective detail view of a multi-purpose motorcycle lift 1 in an upright position. The multi-purpose motorcycle lift 1 includes a base 10, a lift assembly 12, and a lift bar 14. The base 10 comprises a front upright portion 16, a rear upright portion 18, and a platform 20. The front upright portion 18 extends upward perpendicularly from a front end 21 of the platform 20. The rear upright portion 18 extends upward perpendicularly from a rear end 23 of the platform 20 and is parallel to the front upright portion 16. The lift assembly 12 comprises left leg 22, a right leg 24, a front support 26, and a rear support 28. The left leg 22 has a first end 30, a second end 32, a front side 34, and a rear side 36. The right leg 24 has a first end 38, a second end 40, a front side 42, and a rear side 44.

The first end 30 at the front side 34 of the left leg 22 is pivotally connected to a first end 46 of the front upright portion 16 and the first end 30 at the rear side 36 of the left leg 22 is pivotally connected to a first end 50 of the rear upright portion 18, such that the left leg 22 freely pivots with respect to the base 10. The first end 38 at the front side 42 of the right leg 24 is pivotally connected to a second end 48 of the front upright portion 16 and the first end 38 at the rear side 44 of the right leg 24 is pivotally connected to a second end 52 of the rear upright portion 18, such that the right leg 24 freely pivots with respect to the base 10.

A first end 54 of the front support 26 is pivotally connected to the front side 34 of the left leg 22 at the second end 32 thereof, and a second end 56 of the front support 26 is pivotally connected to the front side 42 of the right leg 24 at the second end 40 thereof, such that the front support 26 pivots parallel to the base 10. A first end 58 of the rear support 28 is pivotally connected to the rear side 36 of the left leg 22 at the second end 32 thereof and a second end 60 of the rear support 28 is pivotally connected to the rear side 44 of the right leg 24 at the second end 40 thereof, such that the rear support 28 pivots parallel to the base 10. It has been found that the multi-purpose motorcycle lift 1 is most rigid when the pivotal connections are made using stripper bolts and nuts.

The lift bar 14 comprises a lever 62, a pedal 64, and a stirrup 66. The first end 68 of the lever 62 can be fastened to the left leg 22 at substantially the first end 30. A plurality of fastening holes 75 allow the lever 62 to be located at several different positions between the front side 34 and rear side 36. The variable placement of the lever 62 allows a user to avoid striking any protrusions such as foot pegs which would make it difficult to actuate the lever 62. The pedal 64 is fastened to the second end 70 of the lever 62. The pedal 64 is wide enough to support the width of a large shoe or boot. Each end of the stirrup 66 is fastened to each end of the pedal 64, such that a user may insert a shoe or boot through thereof.

A first projection 72a and a second projection 72b are fastened to the base 10, the first projection 72a and the second projection 72b are located such that the lever 62 fits between thereof through a plurality of fastening holes 77, disposed in the platform 20. A first bore 74a is formed through the first projection 72a and a second bore 74b is formed through the second projection 72b, such that a shot pin 73 may be passed therethrough and prevent the lift bar 14 from moving back to a retracted position. With reference to FIG. 6, a front frame protector 76 is fastened to the front support 26. The frame protector 76 has an anti-slip surface and protects the motorcycle frame from being scratched. A rear frame protector 78 is fastened to the rear support 28 in like manner. The front frame protector 76 and the rear frame protector 78 may be fabricated from a piece of rubber tubing.

Figure 2:
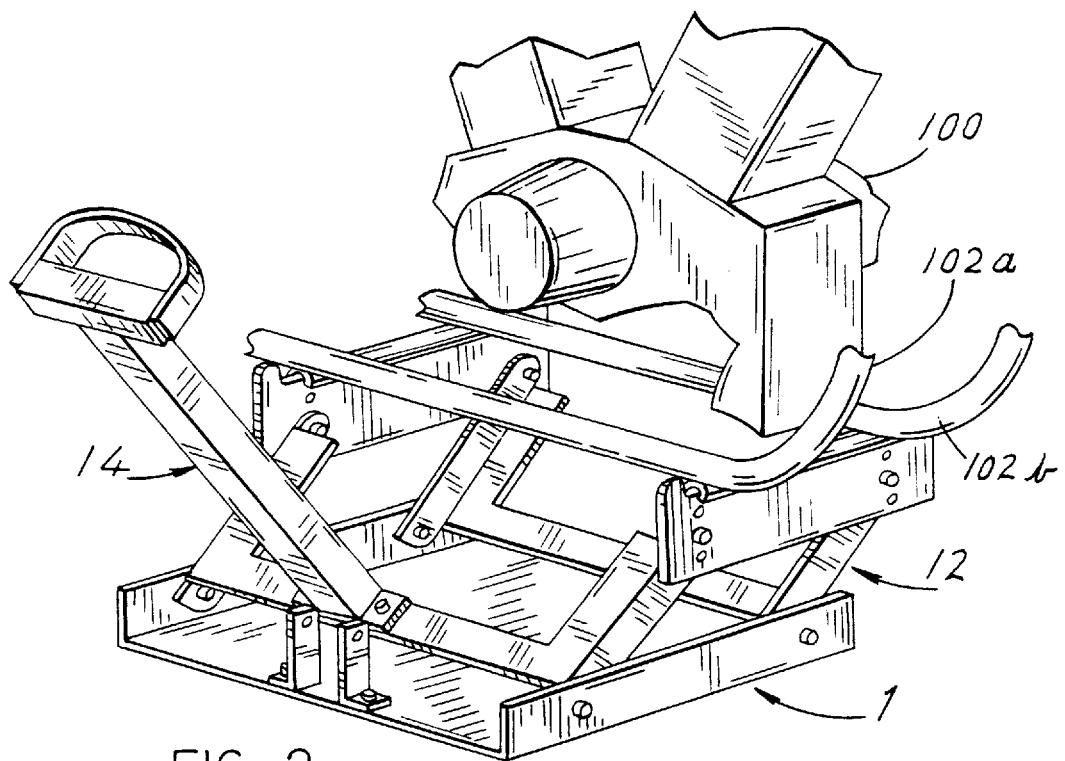
FIG. 2 is a perspective detail view of a multi-purpose motorcycle lift in a retracted position slipped under a motorcycle in accordance with the present invention.

With reference to FIG. 2, the multi-purpose motorcycle lift 1 is operated by first pushing thereof under the frame of a motorcycle 100. With reference to FIG. 4a, the multi-purpose motorcycle lift 1 is positioned such that the frame members 102a and 102b are positioned between a first projection 80 and a second projection 82 of the front support 26. The first projection 80 extends upward from the first end 54 of the front support 26 and the second projection 82 extends upward from the second end 56 of the front support 26. This placement is especially critical when lifting Harley Davidson Sportsters and Hogs. The prior art flat lift surface would crush tail pipes 104a & 104b, or interfere with the engine configurations on certain foreign motorcycle brands.

FIG. 4b shows a rear support 28 with a first projection 84 extending upward from the first end 58 of the rear support 28, and a second projection 86 extending upward from the second end 60 of the rear support 28.

After the multi-purpose motorcycle lift 1 is positioned under the motorcycle 100, the user inserts a shoe into the stirrup 66 and pushes their foot downward as shown in FIG. 2. The lift bar 14 is pressed downward until the first end 30 of the left leg 22 and the first end 38 of the right leg 24 contact the platform 20. When the left leg 22 and right leg 24 are contacting the platform 20 as shown in FIG. 5, the lift assembly 12 is over the center gravity as defined by acute angle A; the motorcycle will remain in an upright position. For safety purposes, the shot pin 73 is inserted through the first projection 72a and the second projection 72b to insure that a user doesn't accidental nudge the multi-purpose motorcycle lift 1 and cause it to return to a retracted position.

The multi-purpose motorcycle lift 1 may be retracted by removing the shot pin 73, inserting a shoe through the stirrup 66 and pulling upward on thereof until the lift assembly 12 passes over the center of gravity. After the lift mechanism 12 passes over the center of gravity, a downward force from the foot is applied to the lift bar 14 to return thereof to the retraced position.

FIG. 3 shows a side detail view of a multi-purpose motorcycle lift 1 in an upright position supporting a motorcycle 100. The dimension X illustrates that frame member 102a is not parallel to the ground. With reference to FIGS. 4a and 4b, this problem is solved by having a plurality of pivot holes 87, 88, and 89 in the front support 26 and a plurality of pivot holes 90, 91 and 92 in the rear support 28, thereof can be attached to the left leg 22 and the right leg 24 to insure that the motorcycle is level with the ground. A motorcycle must be level to the ground to get an accurate reading of oil or transmission fluid levels. Both front support 26 and rear support 28 can also be replaced to accommodate different frame configurations found on different brands of motorcycles. The use of the front support 26 and the rear support 28 for lifting the motorcycle is advantageous for avoiding obstacles such as an oil pan 106 as compared to the flat lifting surfaces of the prior art.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A multi-purpose motorcycle lift comprising:
   a base having a first end and a second end;
   a left leg having a front side and a rear side, said left leg being pivotally connected to said first end of said base;
   a right leg having a front side and a rear side, said right leg being pivotally connected to said second end of said base;
   a front support having a first end and a second end, said first end of said front support being pivotally connected to said front side of said left leg, said second end of said front support being pivotally connected to said front side of said right leg;
   a rear support having a first end and a second end, said first end of said rear support being pivotally connected to said rear side of said left leg, said second end of said rear support being pivotally connected to said rear side of said right leg;
   a lift bar being fastened to said left leg; and
   a stirrup being fastened to the other end of said lift bar.

2. The multi-purpose motorcycle lift of claim 1, further comprising:
   said base having a front end and a rear end;
   a front upright portion which extends perpendicularly upward from a front end of said base;
   a rear upright portion which extends perpendicularly upward from a rear end of said base;
   said left leg being pivotally connected to said first end of said front upright and said rear upright of said base; and
   said right leg being pivotally connected to said second end of said front upright and said rear upright of said base, wherein said multi-purpose motorcycle lift being over the center of gravity when said left leg and said right leg contact said base.

3. The multi-purpose motorcycle lift of claim 1, further comprising:
   said lift bar having a first end and a second end, said first end of said lift bar being fastened to said left leg between said front side and said rear side through a plurality of fastening holes;
   a pedal being fastened to said second end of said lift bar, said pedal being wide enough to support a large boot; and
   said stirrup being fastened to said pedal, said stirrup allowing a large boot to be inserted therethrough.

4. The multi-purpose motorcycle lift of claim 1, further comprising:
   a shot pin;
   a first projection and a second projection extending upward from said base, said first and second projections being disposed through a plurality of fastening holes, such that the lever fits between thereof, a first bore being formed through said first projection, a second bore being formed through the second projection, wherein said shot pin being passed through said first and second bore of said first and projection, respectively, to prevent said lift bar from moving upward.

5. The multi-purpose motorcycle lift of claim 1, further comprising:
   a first projection extending upward from said first end of said front support;
   a second projection extending upward from said second end of said front support, wherein the frame members of a motorcycle are disposed between said first and second projections of said front support;
   a front frame protector being fastened to said front support, said front frame protector extending from said first projection to said second projection of said front support;
   a first projection extending upward from said first end of said rear support;
   a second projection extending upward from said second end of said rear support, wherein the frame members of a motorcycle are disposed between said first and second projections of said rear support; and
   a rear frame protector being fastened to said rear support, said rear frame protector extending from said first projection to said second projection of said rear support.

6. The multi-purpose motorcycle lift of claim 5, further comprising:
   said front support having a plurality of pivot holes in said first end and said second, wherein said multi-purpose motorcycle lift being able to raise a motorcycle such that thereof is level to the ground by choosing from one set of pivot holes disposed in said front support, and
   said rear support having a plurality of pivot holes in said first end and said second, wherein said multi-purpose motorcycle lift being able to raise a motorcycle such that thereof is level to the ground by choosing from one set of pivot holes disposed in said rear support.

7. A multi-purpose motorcycle lift comprising:

a base having a first end and a second end;

a left leg having a front side and a rear side, said left leg being pivotally connected to said first end of said base;

a right leg having a front side and a rear side, said right leg being pivotally connected to said second end of said base;

a front support having a first end and a second end, said first end of said front support being pivotally connected to said front side of said left leg, said second end of said front support being pivotally connected to said front side of said right leg, said front support having at least two pairs of pivot holes which allow said front support to be adjusted vertically;

a rear support having a first end and a second end, said first end of said rear support being pivotally connected to said rear side of said left leg, said second end of said rear support being pivotally connected to said rear side of said right leg, said rear support having at least two pairs of pivot holes which allow said rear support to be adjusted vertically; and a lifting bar being rigidly fastened to said left leg.

8. The multi-purpose motorcycle lift of claim 7, further comprising:

said base having a front end and a rear end;

a front upright portion which extends perpendicularly upward from a front end of said base;

a rear upright portion which extends perpendicularly upward from a rear end of said base;

said left leg being pivotally connected to said first end of said front upright and said rear upright of said base;

said right leg being pivotally connected to said second end of said front upright and said rear upright of said base, wherein said multi-purpose motorcycle lift being over the center of gravity when said left leg and said right leg contact said base.

9. The multi-purpose motorcycle lift of claim 8, further comprising:

said lift bar having a first end and a second end, said first end of said lift bar being fastened to said left leg between said front side and said rear side through a plurality of fastening holes; and a pedal being fastened to said second end of said lift bar, said pedal being wide enough to support a large boot.

10. The multi-purpose motorcycle lift of claim 8, further comprising:

a shot pin;

a first projection and a second projection extending upward from said base, said first and second projections being disposed through a plurality of fastening holes, such that the lever fits between thereof, a first bore being formed through said first projection, a second bore being formed through the second projection, wherein said shot pin being passed through said first and second bore of said first and projection, respectively, to prevent the said lift bar from moving upward.

11. The multi-purpose motorcycle lift of claim 8, further comprising:

a first projection extending upward from said first end of said front support;

a second projection extending upward from said second end of said front support, wherein the frame members of a motorcycle are disposed between said first and second projections of said front support;

a front frame protector being fastened to said front support, said front frame protector extending from said first projection to said second projection of said front support;

a first projection extending upward from said first end of said rear support;

a second projection extending upward from said second end of said rear support, wherein the frame members of a motorcycle are disposed between said first and second projections of said rear support;

a rear frame protector being fastened to said rear support said rear frame protector extending from said first projection to said second projection of said rear support.

12. The multi-purpose motorcycle lift of claim 9, further comprising:

a stirrup being fastened to said pedal, said stirrup allowing a large boot to be inserted therethrough.

* * * * *